United States Patent [19]
Holub et al.

[11] 3,951,582
[45] Apr. 20, 1976

[54] SWITCHING DEVICES FOR PHOTOFLASH UNIT

[75] Inventors: Fred F. Holub; Jan Walter Szymaszek, both of Schenectady, N.Y.

[73] Assignee: General Electric Company, Schenectady, N.Y.

[22] Filed: May 24, 1974

[21] Appl. No.: 473,151

[52] U.S. Cl. ............................ 431/95 R; 252/501; 337/413; 200/61.2; 240/1.3; 431/95 A
[51] Int. Cl.² .................. F21K 5/02; G03B 15/04
[58] Field of Search ............... 431/93, 94, 95, 95 A; 240/1.3; 337/413, 414, 145; 200/61.02; 252/510, 518, 501, 506

[56] References Cited
UNITED STATES PATENTS

| | | | |
|---|---|---|---|
| 2,762,889 | 9/1956 | Waller | 337/413 |
| 3,451,813 | 6/1969 | Kinney et al. | 252/501 |
| 3,458,270 | 7/1969 | Ganser et al. | 431/95 |
| 3,459,488 | 8/1969 | Schroder et al. | 431/95 |
| 3,573,230 | 3/1971 | Van Voorhees | 252/514 |
| 3,751,656 | 8/1973 | Buckler et al. | 431/95 |

*Primary Examiner*—John J. Camby
*Assistant Examiner*—Henry C. Yuen
*Attorney, Agent, or Firm*—Charles T. Watts; Joseph T. Cohen; Jerome C. Squillaro

[57] ABSTRACT

A photoflash unit is designed to have a plurality of lamps fired individually and in sequence includes a plurality of switching devices capable of being easily activated by radiant energy generated during flashing of the lamps. Initially, the switches have a high resistance ("off" position) and after being activated by radiation, they undergo a chemical change to a conductive state ("on" position). The switches are prepared from compositions which impart improved shelf life under conditions of high relative humidity and include a light absorbing, heat transmitting protective coating having absorption characteristics in the range of 3000–5500 A.

8 Claims, 4 Drawing Figures

SWITCHING DEVICES FOR PHOTOFLASH UNIT

The invention relates to multiple photoflash lamp units designed for taking a number of flashlight photographs within a short period of time.

Various designs and constructions have been proposed for multiple flash units. By moving several flashbulbs in a unitary package, manual replacing of individual burnt-out bulbs is avoided. An illustration of such a unit is the flashcube designed to be attached directly to the camera and which may or may not require the use of a battery. The flashcube contains four small flashbulbs, each with its own reflector, and the entire unit is encased in a plastic shield. As the bulb is flashed and the picture is taken, the cube automatically rotates to the next bulb and places the electrical contacts connecting that bulb into position to permit subsequent flashing. Another illustration is the flash array which consists of a nonrotating planar or linear array of photoflash lamps having the bulbs and reflectors mounted linearly as described by J. B. Harnden, et al., U.S. Pat. No. 3,598,985. Such multiple flash units must be able to flash the lamps individually. Thus, flashcubes contain mechanical devices which move a pair of electrical contacts connected to a single lamp into position. An electronic flashing circuit has been used in the flash array in which the switching between individual lamps is accomplished electronically in a unit located outside of the array.

Another switching device for a flash array is described in the copending application of Holub et al., Ser. No. 460,801, filed Apr. 15, 1974., which discloses a series of flash units employing several flashlight lamps to be fired successively. In this unit, part of the thermal energy developed in firing the flashlight lamp actuates a switch for making the next flashlight lamp ready for operation. The switching device disclosed consists of a carbon containing silver salt and a humidity resistant organic polymer binder. The switch initially has a relatively high resistance ("off" position) and, after undergoing a thermochemical change as a result of the thermal energy emitted by the lamp, is converted to metallic silver which has a relatively low resistance ("on" position). However, under adverse conditions upon exposure to light, the silver salts nevertheless exhibit instability.

It is, therefore, an object of the present invention to provide an improved, disposable photoflash lamp unit which is stable under conditions of high temperature and high humidity as well as under adverse light conditions.

In accordance with the present invention, we have discovered a photoflash lamp unit which includes a plurality of flash lamps, an electrical circuit into which said lamps are arranged to fire individually and in sequence, and a plurality of solid state radiant energy switching devices as a part of the electrical circuit. Each device is located adjacent one of the lamps to receive radiant energy emitted by the lamp, the device being a mass of a first composition comprising a carbon-containing silver salt and a humidity resistant organic polymer binder. A protective coating of a second composition comprising a light absorbing heat transmitting coloring agent and an organic film forming resin is then placed over the first composition to improve the stability of the switching device under adverse conditions upon exposure to light.

The invention is more clearly understood from the following description taken in conjunction with the accompanying drawing in which.

Figure 1:
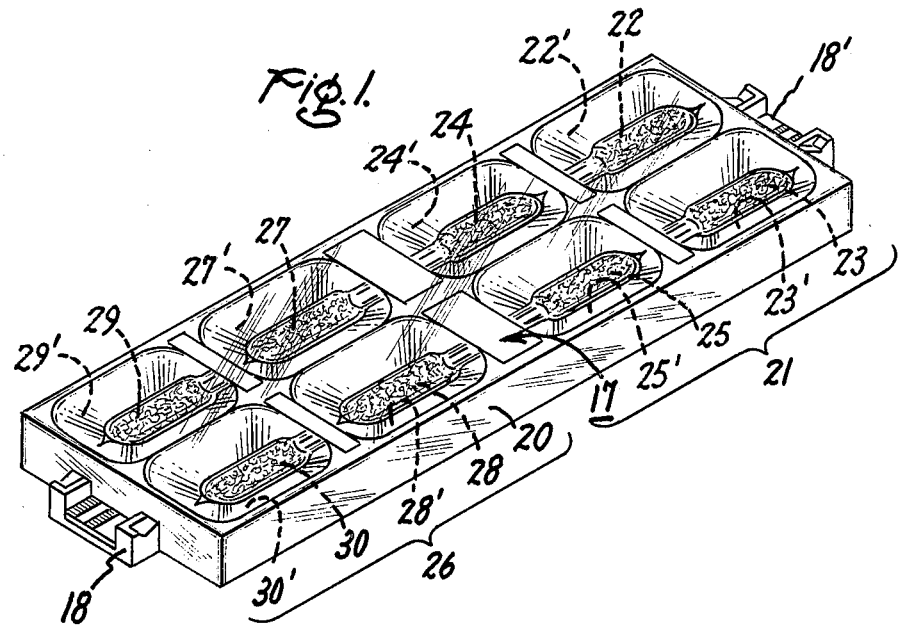
FIG. 1 is a perspective view of a multiple photoflash unit according to the present invention.

Referring now to the drawing, in the embodiment illustrated by FIG. 1, a multiple flash lamp unit 17 shown as being of the planar array type and containing a plurality of electrically fired flash lamps is provided with a pluggedin connector tab 18 at the lower side or end enterof adapted to fit directly into a camera. The lamp array 17 is also provided with a second plug-in connector tab 18' at the top side or end thereof whereby the array 17 is adapted to be attached to the camera in either of two orientations, i.e. with either the tab 18 or 18' plugged into the camera. The array 17 is provided with an upper group 21 of flash lamps 22, 23, 24 and 25 and a lower group 26 of flash lamps 27, 28, 29 and 30. Reflectors 22'–25' and 27'–30' are disposed behind the respective flash lamps so that as each lamp is flashed, its light is projected forwardly of the array 17. The relationship of each reflector to its associated lamp and a suitable plastic housing 20 together with a transparent front cover may be generally that as disclosed in the abovereferenced planar array patent to Harnden.

Figure 2:
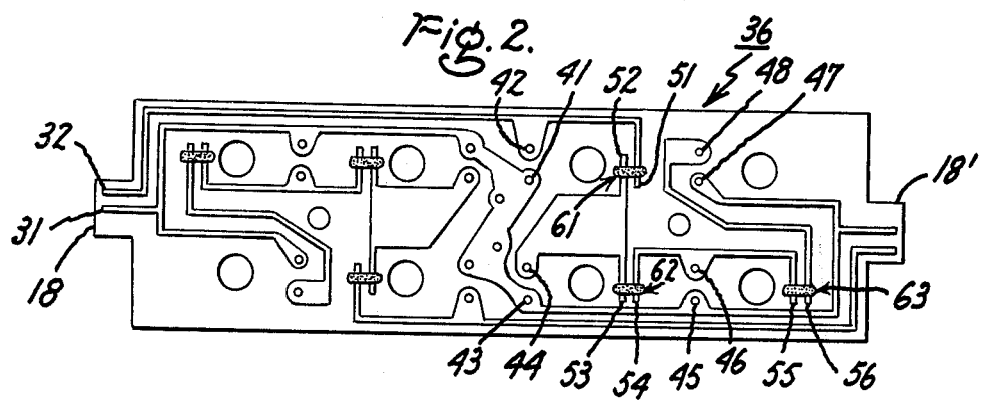
FIG. 2 is a top view of a circuit board showing the electrical circuitry of a multiple flash lamp unit as illustrated by FIG. 1 and incorporating the deposited switching devices.

FIG. 2 shows a circuit board 36 which is contained within the housing 20 behind the reflectors 22', etc., and which supports the flash lamps by their lead-in wires (see FIG. 3) and contains circuitry providing for sequential firing of each group of lamps. The plug-in connector tabs 18 and 18' may be formed integrally with the circuit board 36 on opposite ends thereof as shown. While an entire illustrative printed circuit is shown, only the portion of the printed circuit servicing the upper group 21 will be discussed in detail since the portion of the printed circuit servicing the lower group 26 is depicted as essentially the reverse mirror image thereof. The circuit board 36 is considered from the point of view of being plugged into the camera (not shown) through connector tab 18 whereby the circuit board terminals 31 and 32 make electrical contact with circuitry located within the camera. The circuit board terminal 31 is part of a continuous conductor on the board which is connected to one electrical lead wire of all of the flash lamps and for purposes of this description to the four flash lamps 22, 23, 24 and 25 at points 41, 43, 45 and 47 by suitable means such as soldering, welding or crimping. The second terminal 32 is part of a conductor run that is connected to the second lead wire of lamp 24 at point 42 and terminates at radiation switch terminal 51 which is close to, but spaced apart from, radiation switch terminal 52. Similar switch terminal pairs are located at 53–54 and 55–56. The second lead wires of lamps 25, 23 and 22 are attached at points 44, 46 and 48, respectively. Radiation switches 61. 62 and 63 are respectively positioned to be in contact with the bridging across the respective pairs of switch terminals at 51-52, 53-54, and 55-56. Initially all the switches are in the "off" position which permits only the first bulb 24 in the sequence to be fired. The firing of any flashbulb turns the switch adjacent thereto to the "on" function.

Figure 3:
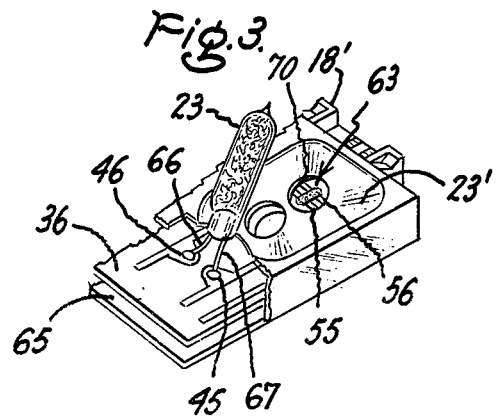
FIG. 3 is a three-dimensional broken-away view showing a single flash lamp in a slightly raised position and also showing the relationship between the lamp and the switch.

FIG. 3 illustrates a single flash lamp 23 in a slightly raised position with the transparent cover removed to show the relative position between the lamp 23 and the switch 63 adjacent thereto below reflector 23'. The flash lamp 23 is attached to and supported by the printed circuit board 36 through leads 66 and 67 at points 45 and 46, respectively. The switch 63 previously described in FIG. 2 bridges switch terminal pair 55 and 56 and an opening 70 is provided in the reflector 23' between the bulb 23 and the switch 63 to facilitate radiation transfer.

When lamp 23 is disposed in its usual position as shown in FIG. 1, a portion of the envelope of the lamp 23 is located about 2 mm. from the switch. As the lamp 23 is flashed, thermal radiation is transmitted to the switch 63 and turns the switch from the "off" position to the "on" by initiating a thermochemical reaction.

Figure 4:
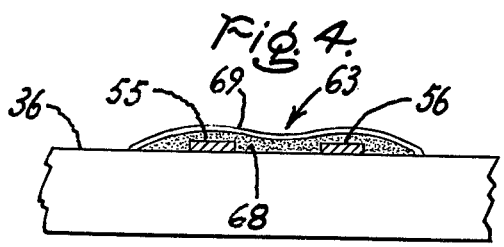
FIG. 4 is a cross sectional view through a single switch including a light absorbing, heat transmitting protective overcoating and the connecting terminals as shown in FIG. 3.

FIG. 4 shows an enlarged cross section of the switch of FIG. 3 and is typical of all radiation switches employed herein. The switch terminal pair 55 and 56 are mounted on the circuit board 36. The radiation switch 63 is applied to the circuit board 36 in electrical contact with the electrode terminals 55 and 56. Each of the radiation switches 61, 62 and 63 upon receiving heat and/or light radiation from the adjacent lamp when it is flashed, changes from an open circuit of high resistance to a closed circuit of low resistance thereby electrically connecting the switch terminals embedded therein.

A suitable material for preparing the first composition, as represented by layer 68, of radiation switch 63 is a carbon-containing silver salt dispersed in a humidity resistant organic polymer binder. The carbon-containing silver salts must be relatively stable under conditions of high humidity and elevated temperature. There is a first group of suitable carbon-containing silver salts requiring no additional powdered carbon additives and these include silver carbonate, silver pyruvate, and silver acetylacetonate. A second group of carbon-containing silver salts do require the addition of powdered carbon and these include silver acetate, silver oxalate, silver citrate, silver behenate and silver benzoate. In either group, the carbon-containing silver salts can be used alone or in mixtures together with minor amounts of silver oxide up to about 30% by weight.

The humidity resistant organic polymer binder provides a medium to hold the mixture together and may also be used with or without a plasticizer. The amount of binder is preferably about 5–10 weight percent based on the carboncontaining silver salt. Useful binders include the cellulose esters, such as cellulose nitrate; the cellulose ethers, such as ethyl cellulose and ethyl hydroxyethyl cellulose; acrylates such as polymethylmethacrylate, polymethylacrylate; polycarbonate; and polystyrene.

Also, dark colored, heat absorbing additives which increase the amount of absorption of heat given off by the flash lamp may be incorporated in the coating mixture. These include materials such as carbon, copper oxide, and stannous oxide. Of these, carbon additionally imparts desirable electrical properties for testing of the switches without activating them.

The protective coating 69 is formed from a second composition which is a light absorbing, heat transmitting coloring agent incorporated in an organic film forming resin. A thin coating of the composition is placed directly over the first composition to protect the silver salt from adverse conditions of extended exposure to light. A preferred class of coloring agents are red colored dyes which are commercially available from GAF Corporation. Typically the concentration of the dye in the solution for applying the coating composition is in the range of 0.25–0.5% by weight. The preferred film forming resins are commercially available from E. I. Du Pont and Co. under the trademark Elvacite acrylic resins. Representative resins are Elvacite 2046 which is n-butyl/-isobutyl methacrylate 50/50 copolymer having a typical inherent viscosity of 0.61 and a high molecular weight, and Elvacite 6015 which is a solution in methylethyl ketone (40% solids by weight) of methyl/n-butyl methacrylate copolymer having a typical inherent viscosity of 0.25 and a low molecular weight.

In applying the switches to the circuit board between the electrical terminals, conventional coating techniques may be used which require the presence of an organic diluent or solvent. Useful solvents include pine oil, hydrocarbon fluids, esters, e.g. butylacetate, etc., which are conventionally used in silk screening. The slurry for deposition of the first composition is formed by mixing the carbon-containing silver salt, the organic binder and the solvent to form a slurry. This may be applied across the terminals for the switch by conventional means as a thin coating and preferably by silk screening techniques. The second coating composition is similarly prepared by mixing the light-absorbing, heat transmitting coloring agent together with the organic film forming resin and a compatible solvent. This is applied directly over the first composition as a thin protective coating using conventional techniques.

Our invention is further illustrated by the following example:

EXAMPLE

A milled powder of high purity silver carbonate was prepared by combining a commercially available silver carbonate with toluene and grinding in a porcelain mill. The powder was filtered and air dried at room temperature. A dispersion suitable for coating was then prepared by mixing 10 grams of the silver carbonate powder with 4 grams of a binder solution consisting of 12.5 parts by weight of ethyl cellulos dissolved in 87.5 parts by weight of pine oil.

Phenolic printed circuit boards such as illustrated by FIG. 2 were prepared with tinned leads having a thickness of 1.3 mils and with spaced electrodes located 1.5 mm. apart. Thermochemical switches, elliptical in shape with a major axis of about 6 mm. and a minor axis of about 4 mm. were then screen printed between the electrodes using a 200 mesh stainless steel screen with a 3 mil emulsion backing and a Presco printer. The circuit boards were air dried 15 to 30 minutes and then oven dried at a temperature of 100° C. for about 1 hour. The thickness of the screen coating after drying was 2 to 2.5 mils.

Thereafter a protective coating solution of a red dye was prepared as follows:

| | |
|---|---|
| Base Solution | 95 gms. of methylethyl ketone<br>5 gms. of 50/50 copolymer of n-butylisobutylmethacrylate (Elvacite 2046) |
| Coating Solution | 25 gms. of base solution<br>0.125 gms. of GAF Sudan Red dye GGA |

The circuit boards were sprayed twice with the coating solution.

The thermochemical switches were then evaluated by firing high voltage flashbulbs at a standard distance of about 4 mm. from the surface of the switch. The current source was a piezoelectric cell measuring 100 × 100 mils which was struck by a hammer having a force of one inch-ounce to yield a pulse of about 2 kilovolts for a duration of 5 microseconds. Originally, the resistance of the switch was determined to be about $10^{10}$ ohms or greater, and after activation, the resistance was in the range of 0.1–10 ohms. A multiplicity of these switches along with the complete circuit is shown in FIG. 2.

It will be appreciated that the invention is not limited to the specific details shown in the examples and illustrations and that various modifications may be made within the ordinary skill in the art without departing from the spirit and scope of the invention.

We claim:

1. A photoflash lamp unit comprising
   a. a pair of flash lamps,
   b. an electrical circuit into which said lamps are arranged to fire individually and in sequence, and
   c. a solid state, radiant energy device located external of the lamps and forming part of the electrical circuit, said switching device being located adjacent one of said lamps and disposed to receive radiant energy emitted by the lamp, said photoflash unit being characterized by said switching device being a high relative humidity and temperature resistant mass of a first composition comprising a carbon-containing silver salt and a humidity resistant organic polymer binder selected from the group consisting of cellulose esters, cellulose ethers, polyalkylacrylates, polyalkylmethacrylates, polystyrene and polycarbonate, and a protective coating over said first composition comprising a light absorbing and heat transmitting coloring agent and an organic film forming material whereby the stability of the switching devices is improved under adverse conditions upon exposure to light.

2. The unit of claim 1, wherein the light absorption is in the range of 3000–5500 A.

3. The unit of claim 1, wherein said carboncontaining silver salt is a member selected from the group consisting of silver carbonate, silver pyruvate, and silver acetylacetonate.

4. The unit of claim 3 wherein the composition consists essentially of silver carbonate dispersed in an ethyl-cellulose binder.

5. The unit of claim 3 wherein said coloring agent is a red dye.

6. The unit of claim 3 wherein the film forming material is an acrylic resin.

7. The unit of claim 6 wherein the resin is an n-butylisobutyl methacrylate copolymer.

8. The unit of claim 6 is a methyl-n-butyl methacrylate copolymer.

* * * * *